US012619424B2

(12) United States Patent
Ramamurthy et al.

(10) Patent No.: US 12,619,424 B2
(45) Date of Patent: May 5, 2026

(54) ROBOTIC SCRIPT GENERATION BASED ON PROCESS VARIATION DETECTION

(71) Applicant: EPIANCE SOFTWARE PVT. LTD., Bangalore (IN)

(72) Inventors: Ravi Ramamurthy, Bangalore (IN); Ramgopal M. Cillanki, Bangalore (IN)

( * ) Notice: Subject to any disclaimer, the term of this patent is extended or adjusted under 35 U.S.C. 154(b) by 1242 days.

(21) Appl. No.: 16/005,750

(22) Filed: Jun. 12, 2018

(65) Prior Publication Data

US 2019/0324781 A1     Oct. 24, 2019

(30) Foreign Application Priority Data

Apr. 24, 2018    (IN) ............................. 201841015557

(51) Int. Cl.

| | |
|---|---|
| *G06F 8/70* | (2018.01) |
| *G06F 9/455* | (2018.01) |
| *G06F 18/24* | (2023.01) |
| *G06N 3/045* | (2023.01) |
| *G06N 3/088* | (2023.01) |
| *G06N 5/046* | (2023.01) |
| *G06N 20/00* | (2019.01) |
| *G06V 10/82* | (2022.01) |
| *G06V 30/10* | (2022.01) |
| *G06V 30/146* | (2022.01) |
| *G06V 30/19* | (2022.01) |

(52) U.S. Cl.
CPC ............ *G06F 8/70* (2013.01); *G06F 9/45512* (2013.01); *G06F 18/24* (2023.01); *G06N 3/045* (2023.01); *G06N 3/088* (2013.01); *G06N 5/046* (2013.01); *G06N 20/00* (2019.01); *G06V 10/82* (2022.01); *G06V 30/19173* (2022.01); *G06V 30/10* (2022.01); *G06V 30/147* (2022.01)

(58) Field of Classification Search
CPC ............................. G06N 20/00; G06N 3/0454
See application file for complete search history.

(56) References Cited

U.S. PATENT DOCUMENTS

| | | | |
|---|---|---|---|
| 11,586,463 B2 * | 2/2023 | Maheshwari ....... | G06F 16/2358 |
| 2010/0150448 A1 * | 6/2010 | Lecerf ................... | G06F 18/253 |
| | | | 382/190 |
| 2017/0220540 A1 * | 8/2017 | Wang ................... | G06F 40/174 |

(Continued)

OTHER PUBLICATIONS

El-Alami et al, "An Efficient Method based on Deep Learning Approach for Arabic Text Categorization", 2016, International Arab Conference on Information Technology, pp. 1-7. (Year: 2016).*

(Continued)

*Primary Examiner* — Alexey Shmatov
*Assistant Examiner* — Clint Mullinax
(74) *Attorney, Agent, or Firm* — Prakash Nama; Global IP Services, PLLC

(57) ABSTRACT

Techniques for generating Robotic Scripts via Process Variation Detection are described. In one example, captured process steps related to an activity performed in an application may be received. Variations of the process steps are then determined by training a first Artificial Neural Network (ANN) with the captured process steps. A set of the process steps for performing the activity, may then be determined based on the determined variations of the process steps. Robotic scripts may be generated using the determined set of process steps to perform the activity.

21 Claims, 14 Drawing Sheets

(56) References Cited

U.S. PATENT DOCUMENTS

| | | | | |
|---|---|---|---|---|
| 2018/0060702 A1* | 3/2018 | Ma | ........................ | G06V 10/764 |
| 2018/0173698 A1* | 6/2018 | Dubey | .................... | G06F 40/30 |
| 2018/0174043 A1* | 6/2018 | Po | ......................... | G16H 50/20 |
| 2019/0068733 A1* | 2/2019 | Lewis | ..................... | H04L 67/55 |
| 2019/0236460 A1* | 8/2019 | Jagota | .................... | G06N 5/025 |

OTHER PUBLICATIONS

Umbrich et al, "Towards Dataset Dynamics: Change Frequency of Linked Open Data Sources", 2010, Proceedings of 3rd International Workshop on Linked Data on the Web, pp. 1-8. (Year: 2010).*
Umbrich et al, "Towards Dataset Dynamics: Change Frequency of Linked Open Data Sources", 2010, LDOW2010, all pages. (Year: 2010).*
El-Alami et al, "An Efficient Method based on Deep Learning Approach for Arabic Text Categorization", 2016, International Arab Conference on Information Technology (ACIT'2016), all pages. (Year: 2016).*

* cited by examiner

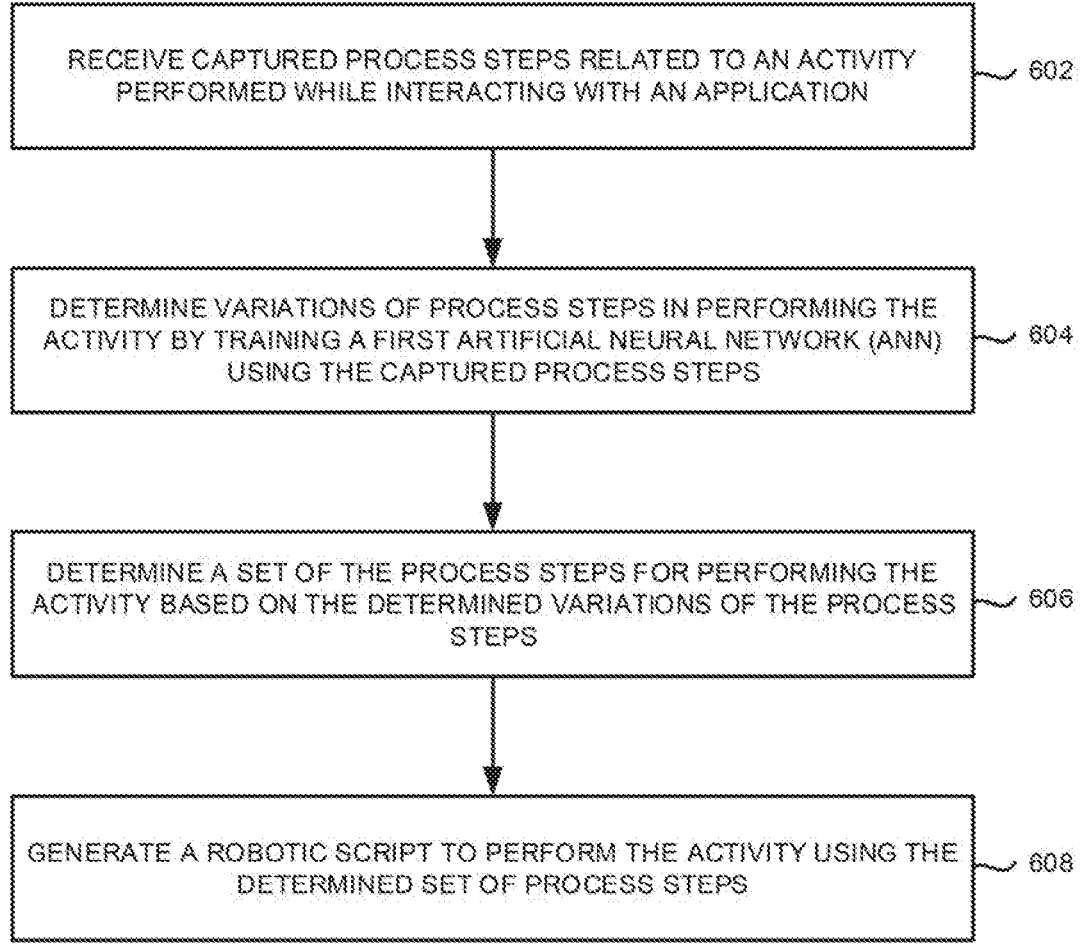

RECEIVE CAPTURED PROCESS STEPS RELATED TO AN ACTIVITY PERFORMED WHILE INTERACTING WITH AN APPLICATION — 602

DETERMINE VARIATIONS OF PROCESS STEPS IN PERFORMING THE ACTIVITY BY TRAINING A FIRST ARTIFICIAL NEURAL NETWORK (ANN) USING THE CAPTURED PROCESS STEPS — 604

DETERMINE A SET OF THE PROCESS STEPS FOR PERFORMING THE ACTIVITY BASED ON THE DETERMINED VARIATIONS OF THE PROCESS STEPS — 606

GENERATE A ROBOTIC SCRIPT TO PERFORM THE ACTIVITY USING THE DETERMINED SET OF PROCESS STEPS — 608

RECEIVE AN INPUT DOCUMENT — 702

CLASSIFY THE INPUT DOCUMENTS USING A SECOND ARTIFICIAL NEURAL NETWORK — 704

DETERMINE THE INPUT DOCUMENT CORRESPONDS TO THE ACTIVITY BASED ON THE CLASSIFICATION — 706

AUTOMATICALLY FILLING A FORM RELATED TO THE INPUT DOCUMENT BY EXECUTING THE SET OF PROCESS STEPS UPON DETERMINING THAT THE INPUT DOCUMENT CORRESPONDS TO THE ACTIVITY — 708

— 700

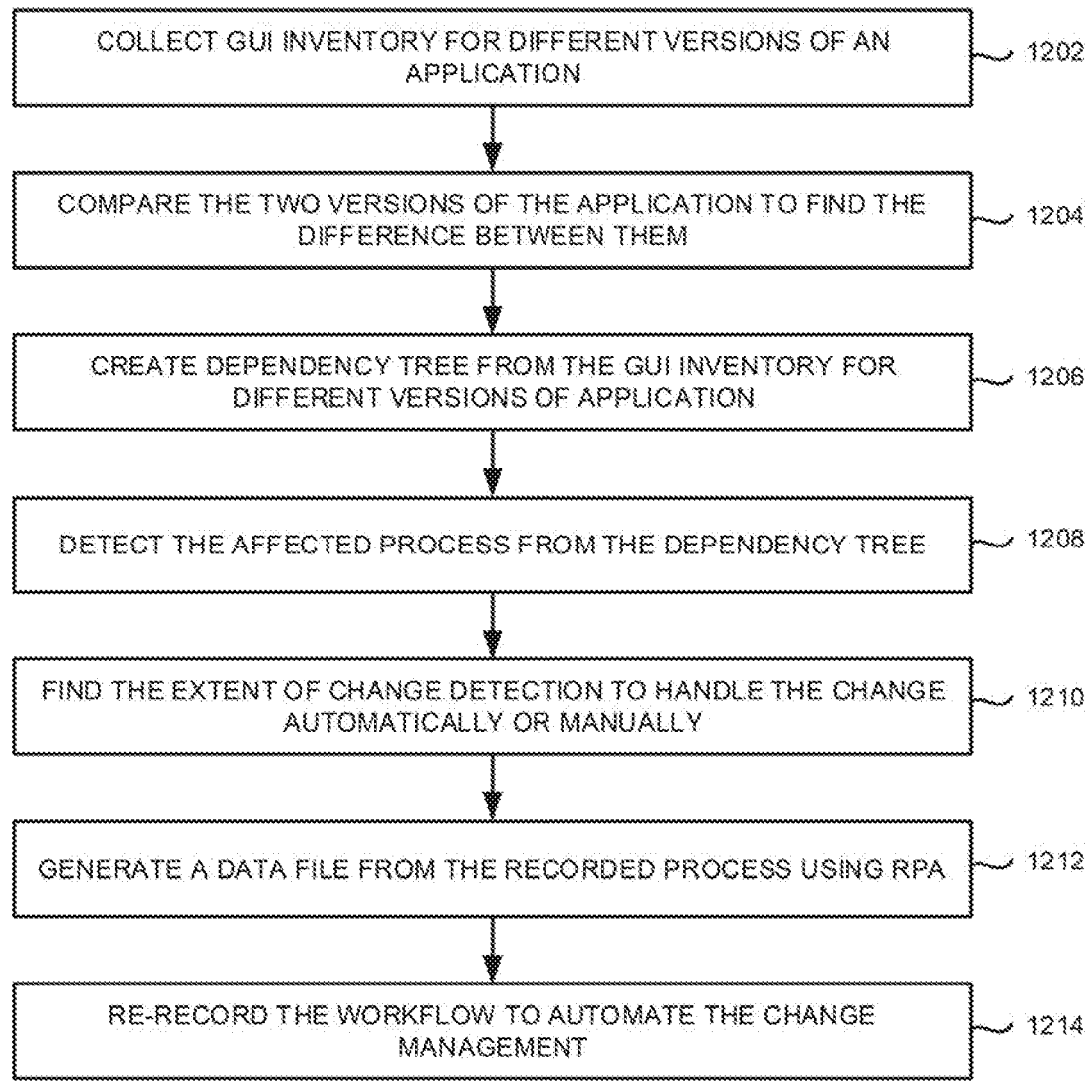

COLLECT GUI INVENTORY FOR DIFFERENT VERSIONS OF AN APPLICATION — 1202

COMPARE THE TWO VERSIONS OF THE APPLICATION TO FIND THE DIFFERENCE BETWEEN THEM — 1204

CREATE DEPENDENCY TREE FROM THE GUI INVENTORY FOR DIFFERENT VERSIONS OF APPLICATION — 1206

DETECT THE AFFECTED PROCESS FROM THE DEPENDENCY TREE — 1208

FIND THE EXTENT OF CHANGE DETECTION TO HANDLE THE CHANGE AUTOMATICALLY OR MANUALLY — 1210

GENERATE A DATA FILE FROM THE RECORDED PROCESS USING RPA — 1212

RE-RECORD THE WORKFLOW TO AUTOMATE THE CHANGE MANAGEMENT — 1214

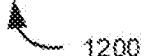

PROCESSOR(S) 104

RECEIVE CAPTURED PROCESS STEPS RELATED TO AN ACTIVITY PERFORMED WHILE INTERACTING WITH AN APPLICATION — 1404

DETERMINE VARIATIONS OF PROCESS STEPS IN PERFORMING THE ACTIVITY BY TRAINING A FIRST ARTIFICIAL NEURAL NETWORK (ANN) USING THE CAPTURED PROCESS STEPS — 1406

DETERMINE A SET OF THE PROCESS STEPS FOR PERFORMING THE ACTIVITY BASED ON THE DETERMINED VARIATIONS OF THE PROCESS STEPS — 1408

GENERATE A ROBOTIC SCRIPT TO PERFORM THE ACTIVITY USING THE DETERMINED SET OF PROCESS STEPS — 1410

NON-TRANSIROTY MACHINE-READABLE STORAGE MEDIUM 1402

 1400

FIG. 14

ROBOTIC SCRIPT GENERATION BASED ON PROCESS VARIATION DETECTION

RELATED APPLICATIONS

Benefit is claimed under 35 U.S.C. 119(a)-(d) to Foreign Application Serial No. 201841015557 filed in India entitled "ROBOTIC SCRIPT GENERATION BASED ON PROCESS VARIATION DETECTION", on Apr. 24, 2018, by Epiance Software Pvt. Ltd., which is herein incorporated in its entirety by reference for all purposes.

BACKGROUND

Currently, various software applications have interfaces designed to accomplish certain activities by following a sequence of Graphical User Interface (GUI) interactions. Activities may include business process activities like collecting and organizing data from databases, filling application forms, digitalizing offline forms by manual data entry, and the like. Such activities may be carried out manually by a user of the software application by following a sequence of GUI interactions. Some of these activities may be repetitive in nature but may be unavoidable. In such a scenario, using human users to manually perform these interactions may be time consuming and error prone. However, using human users may be unavoidable as most of these process steps are heavily reliant on the decision-making abilities of the user.

BRIEF DESCRIPTION OF THE DRAWINGS

Examples are described in the following detailed description and in reference to the drawings, in which:

FIG. 6 is an example flow diagram of a method of generating a robotic script by process variation detection using ANNs;

FIG. 12 is an example flow diagram of a change management process;

FIG. 14 is a block diagram of an example system instructions in a machine-readable storage medium for robotic script generation.

DETAILED DESCRIPTION

The Robotic Script Generation System may capture user interactions (e.g., process steps) in a Graphical User Interface (GUI) based application. The captured process steps may relate to user actions performed in the GUI to execute an activity in an application. The captured process steps may then be used in training a first Artificial Neural Network (ANN) to determine variations of process steps for performing the activity. Based on the determined variations, a set of process steps may then be determined. Further, based on the determined set of process steps, robotic scripts may be generated for performing the activity. Furthermore, the robotic scripts, upon execution, may automatically execute the set of process steps to perform the activity in the software application.

Examples described herein may include various subsystems that may or may not be necessary and may be assembled as needed for any given requirement. Further, the term "user interactions" refers to human interface device (e.g., mouse, keyboard, trackpad and so on) actions performed by the user or a robot. The actions may be performed on displayed "textual and visual information", which may be graphical user interface (GUI) elements, character-based interfaces and so on. The terms "user interactions", "user actions", and "process steps" may be used interchangeably throughout this document. Furthermore, example target business process software applications may include SAP®, applications, PeopleSoft® applications, SalesForce® applications, web-based software applications and so on.

The term robotic script may refer to any type of "software bot" that is capable of mimicking user actions that may be performed in a software application. The user actions may include identifying GUI fields and performing actions on the GUI fields using input devices such as mouse, keyboard, touchpad, and the like. Example GUI fields may include a text box, form field, radio button, check box, menu items, actions buttons, text fields, and the like. The robotic script may automate any user action that may be performed in a software application.

Figure 1:
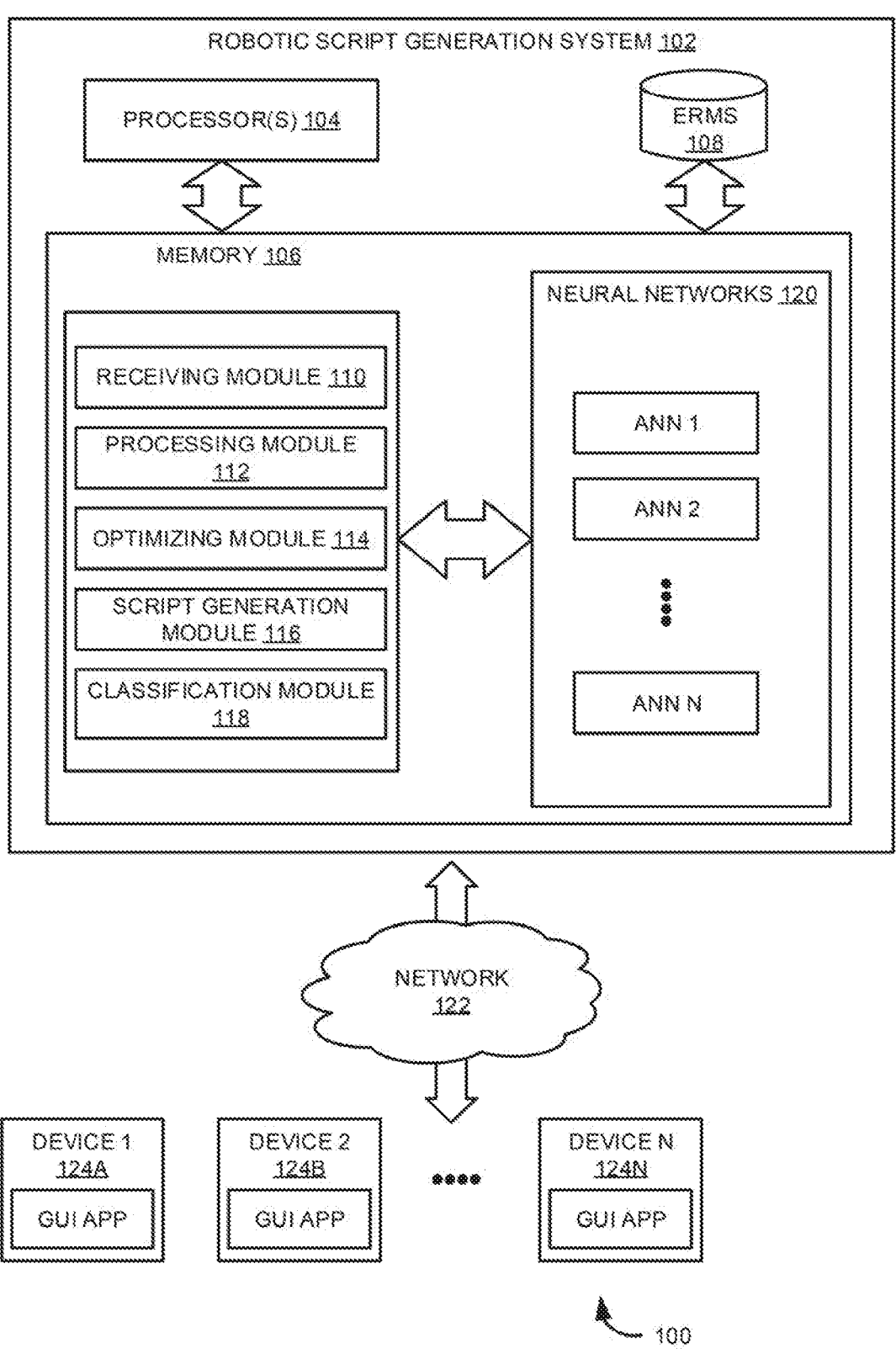
FIG. 1 is a block diagram illustrating an example robotic script generation system connected to a plurality of devices via a network.

Referring to figures, FIG. 1 is a block diagram 100 illustrating an example Robotic Script Generation System 102 connected to a plurality of devices 124 A-N via a network 122. As shown in FIG. 1, the Robotic Script Generation System 102 may include processor(s) 104 and memory 106 that are communicatively coupled to each other. Further, Robotic Script Generation System 102 may include an enterprise repository management system (ERMS) 108 that is communicatively connected to the memory 106. Furthermore, as shown in FIG. 1, memory 106 may include a receiving module 110, a training module 112, an optimizing module 114, a script generation module 116, a classification module 118, and neural networks 120.

During operation, the receiving module 110 may receive captured process steps from the plurality of devices 124 A-N via network 122. Herein, the captured process steps may correspond to various sequences of GUI interactions carried out for performing the activity. The captured process steps may be used in training a first ANN and variations of process steps are determined by a processing module 112. The received process steps may be fed to the first ANN in the form of XML files and/or hash codes. The first ANN receives the input via an input layer and generates an output via an output layer in the form of variations of process steps. The number of hidden layers between the input and output layers may vary according to the complexity of the activity that is to be performed. Accordingly, the input may include captured process steps and the output, generated by the processing module 112 by training the first ANN, may include variations of process steps.

Each variation may constitute diverse ways in which an activity may be performed. In an example, a process step of submitting a form may be performed either by "clicking" the submit button using a mouse or by selecting and triggering the "submit button" using the keyboard. Both are variations of performing the same activity of submitting a form. Thus, the first ANN may determine several variations of performing a single activity.

In one example, an activity A may be performed by a user by following sequence of process steps 1, 2, 3, 4, 5. Another user may be performing the same activity by following sequence of process steps 1, 3, 4, 6, 8. These actions are received as captured process steps by the receiving module 110. There may be several variations of process steps that could be followed for performing activity A. The processing module 112 may determine several variations of process steps that may be followed for performing the activity. The processing module 112 uses the first ANN for determining the variations of process steps. In one example, process step variations V1 to Vn are determined by the processing module 112. In one example, $V_1$ may include process steps 1, 2, 3, 4, 5; $V_2$ may include process steps 1, 3, 5, 6; $V_3$ may include process steps 1, 4, 5, and so on. Activity A may be performed by executing any one of the determined variations of process steps.

Further, optimizing module 114 determines a set of process steps for performing the activity based on the determined variations of the process steps. The set of process steps may correspond to a set of process variations for performing the activity. Optimizing module 114 may determine the set of process steps in such a way that the determined set of process steps could perform the activity in an optimal manner using minimum amount of resources. The determined set of process steps may substantially reduce processor and the memory usage for performing the activity. Amongst V1 to Vn determined by the processing module 112, the set of process variation which performs the activity most efficiently may be selected by the optimizing module 114.

In one example, a generic spreadsheet file may be saved either by a series of mouse interactions including: file→save→okay. The same activity may be performed by triggering a keyboard shortcut "ctrl+s". While both sets of process steps may perform the same activity, optimizing module 114 may choose the latter set of process steps (i.e., ctrl+s) from the determined variations of process steps as the latter may reduce time and resource usage. The script generation module 116 may generate a robotic script to perform the activity using the determined set of process steps. The generated robotic script may mimic user actions by executing a series of user interactions (process steps) thereby performing the activity.

The robotic scripts may be generated by the script generation module 116 either automatically or manually. In one example, automated generation of robotic scripts by the script generation module 116 may be referred to as robots making robots. Herein, the robotic script generation system 102 which itself is a script generation tool automatically generates robotic scripts for performing activities. Further, the script generation module 116 may also be configured to generate scripts manually with the assistance of a user. The script generation module 116 may herein allow the user to modify the generated robotic scripts. Furthermore, the scripts may be generated in a simulated environment instead of a live environment. Generation of scripts in a simulated environment may be done during the training phase so that the generated scripts may be monitored and modified by the user manually. Manual generation of scripts may be performed in the simulated environment during the training phase of the ANNs so that errors may be identified and rectified by the user until the ANN is trained to achieve a predefined accuracy/reliability.

The processing module 112 communicates with the neural networks 120 to train the first ANN using the captured process steps. The captured process steps may be fed to the first ANN in the form of XML files and/or hash codes. While generating XML files, elaborate XML information for each user interaction may be captured. For control and process step identification, parameters such as control name, control type, control region, control id, control data, event name etc., may be captured in the XML file. Alternatively, the parameters described above may be captured as hash codes which uniquely identifies each user interaction. In both the files, the process steps may be recorded in the sequence in which they were performed by the user.

The first ANN may be a recurrent neural network (RNN) designed to handle sequence dependence. The type of RNN that may be used in determining process variation may include a Long Short-Term Memory (LSTM) Network. LSTM is a type of RNN used in deep learning because substantially complex architectures may be trained using this model. The LSTM network is a RNN that is trained using back propagation through time. LSTM may be used to create large recurrent networks, that in turn may be used to address complex sequence problems in machine learning and achieve state-of-the-art results. Instead of neurons, LSTM networks have memory blocks that are connected into layers. A block has components that make the LSTM smarter than a classical neuron and a memory for recent sequences. A block contains gates that manage the block's state and output. A block operates upon an input sequence and each gate within a block uses the sigmoid activation units to control whether they are triggered or not, making the change of state and addition of information flowing through the block conditional in nature.

Components of robotic script generation system 102 may be any combination of hardware and programming to implement the functionalities described herein. In some implementations, the programming may be processor 104 executable instructions stored on a non-transitory machine-readable storage medium (e.g., memory 106), and the hardware may include at least one processing resource to retrieve and/or execute those instructions. Processor(s) 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Processor(s) 104 thus may also include the functionality to encode messages and/or data or information. Processor(s) 104 may include, among other things, a clock, an arithmetic logic unit (ALU) and logic gates configured to support operation of processor(s) 104. Further, the processor(s) 104 may include functionality to execute one or more software programs, which may be stored in the memory 106 or otherwise accessible to processor(s) 104.

Memory 106, may store any number of pieces of information, and data, used by the system to implement the functions of the system. The memory 106 may include for example, volatile memory and/or non-volatile memory. Examples of volatile memory may include but are not limited to volatile random-access memory (RAM). The non-volatile memory may additionally or alternatively comprise an electrically erasable programmable read only memory (EEPROM), flash memory, hard drive, and the like. Some examples of the volatile memory include, but are not limited to, dynamic RAM, static RAM, and the like. Some example of the non-volatile memory includes, but are not limited to, hard disks, magnetic tapes, optical disks, programmable read only memory, erasable programmable read only memory, electrically erasable programmable read only memory, flash memory, and the like. Memory 106 may be configured to store information, data, applications, instructions or the like for enabling the system to carry out various functions in accordance with various example embodiments. Additionally, or alternatively, the memory 106 may be configured to store instructions which when executed by processor(s) 104 causes the robotic script generation system 102 to behave in a manner as described in various embodiments.

In one implementation, the network 122 may be a wireless network, a wired network or a combination thereof. The network 122 may be implemented as one of the several types of networks, such as intranet, local area network (LAN), wide area network (WAN), the internet, and the like. The network 122 may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 122 may include a variety of network devices, including routers, bridges, servers, computing devices, storage devices, and the like.

Figure 2A:
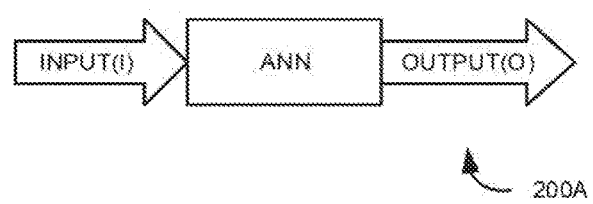
FIG. 2A is a block diagram of an example Artificial Neural Network (ANN) trained for determining process variations.
Figure 2B:
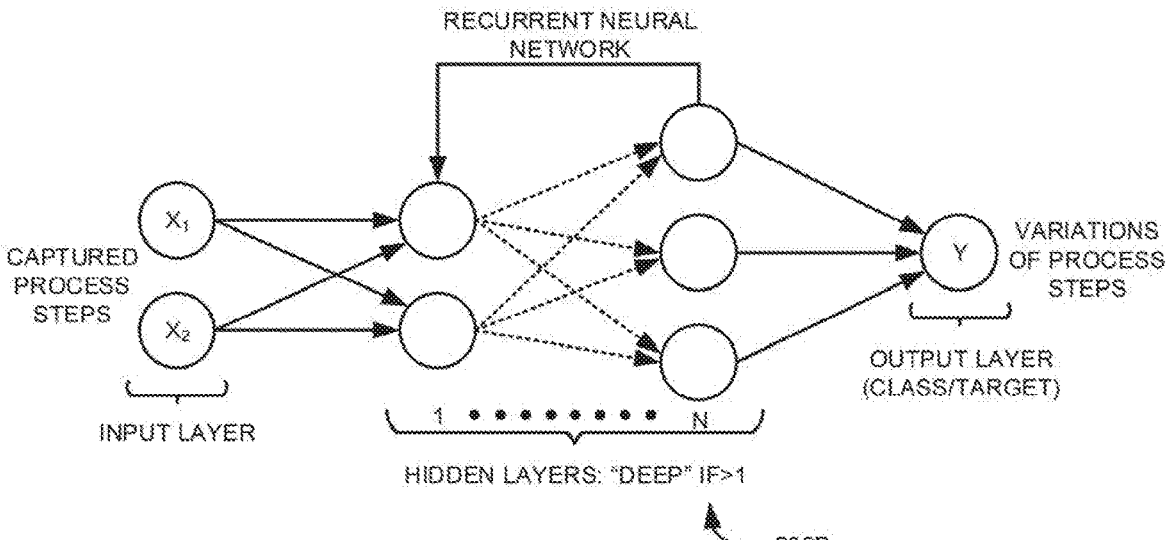
FIG. 2B is an example illustration of a Recurrent Neural Network trained for determining process variations.
Figure 2C:
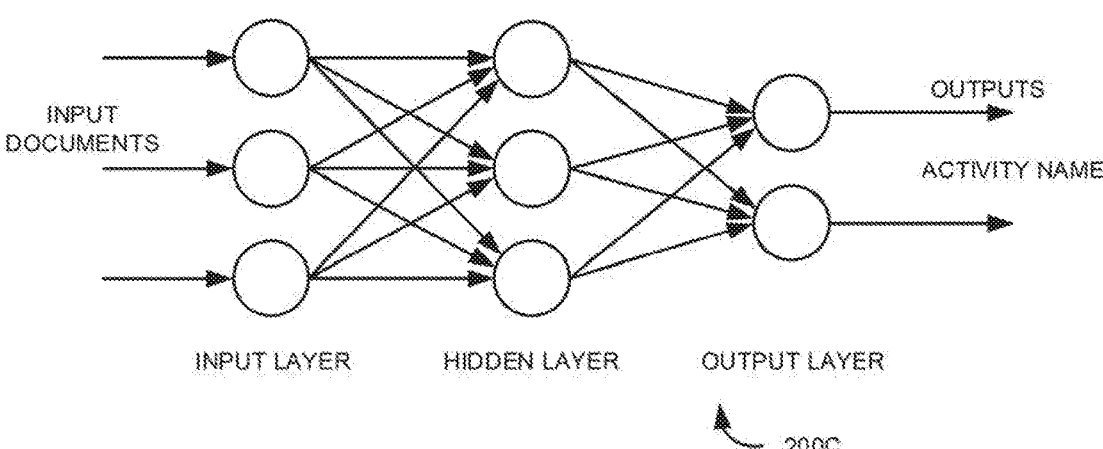
FIG. 2C is an example illustration of a Feed Forward Neural Network trained for performing process discovery.

FIG. 2A is a block diagram 200A of an example Artificial Neural Network (ANN) trained for determining process variations. Input is fed into at the input layer, the input is processed by a series of hidden layers to result in an output at the output layer. FIG. 2B is an example illustration 200B of a RNN trained for determining process variations. FIG. 2C is an example illustration 200C of a Feed Forward Neural Network trained for performing process discovery.

RNNs take each vector from a sequence of input vectors and model them one at a time. This allows the network to retain state while modelling each input vector across the window of input vectors. Modelling the time dimension is an advantage of RNNs. RNNs model the time aspect of data by creating cycles in the network. At each time-step of sending input through a recurrent network, nodes receiving input along recurrent edges receive input activations from the current input vector and from the hidden nodes in the network's previous state. The output is computed from the hidden state at the given time-step. The previous input vector at the previous time step may influence the current output at the current time-step through the recurrent connections. RNNs are known to have issues with the "vanishing gradient problem." This issue may occur when the gradients become too large or too small and make it difficult to model long-range dependencies (10 time-steps or more) in the structure of the input dataset. The most effective way to get around this issue is to use the LSTM variant of RNNs.

The first ANN used herein uses an LSTM variant of RNN. The critical component of the LSTM network is the memory cell and the gates (including the forget gate, but also the input gate). The contents of the memory cell are modulated by the input gates and forget gates. If both gates are closed, the contents of the memory cell will remain unmodified between one time-step and the next. The gating structure allows information to be retained across many time-steps, and consequently also allows gradients to flow across many time-steps. This allows the LSTM model to overcome the vanishing gradient problem that occurs with most RNN models.

Once trained, the LSTM model may identify variations of process steps using regression technique. Further, process variations may be linked to activities by the LSTM model using classification techniques. In both scenarios, the model may be trained by providing a sequence of steps via XML files or hash codes at the input layer. In regression post training, given a sequence of steps the neural network may predict the likely next steps to be performed for performing the activity. In classification, the neural network determines the category to which the steps belong to thereby connecting the process steps to the activity.

Referring to FIG. 2B, captured process steps are fed as inputs to the first ANN (e.g. LSTM Neural Network). The LSTM neural network processes the inputs and generates variations of process steps as outputs. The input is fed as XML files or hash codes at the input layer. At the output layer, several variations of process steps for performing the activity is obtained. Referring to FIG. 2C, documents are fed as inputs at the input layer of the second ANN (e.g. Convolutional Neural Network (CNN) or Deep Auto Encoder). The documents are processed through the hidden layers. The second ANN may be a pre-trained network that may be used for process discovery. The second ANN classifies the input document and determines the activity corresponding to the input document. At the output layer, activity name corresponding to the input document is obtained.

Figure 3A:
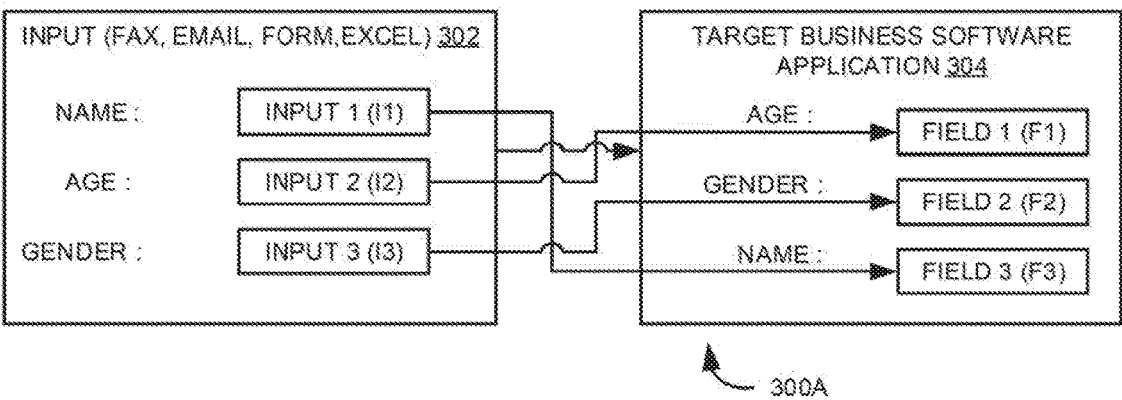
FIG. 3A depicts an example schematic diagram illustrating an activity performed in target business application via a robotic process using robotic script generation system.
Figure 3B:
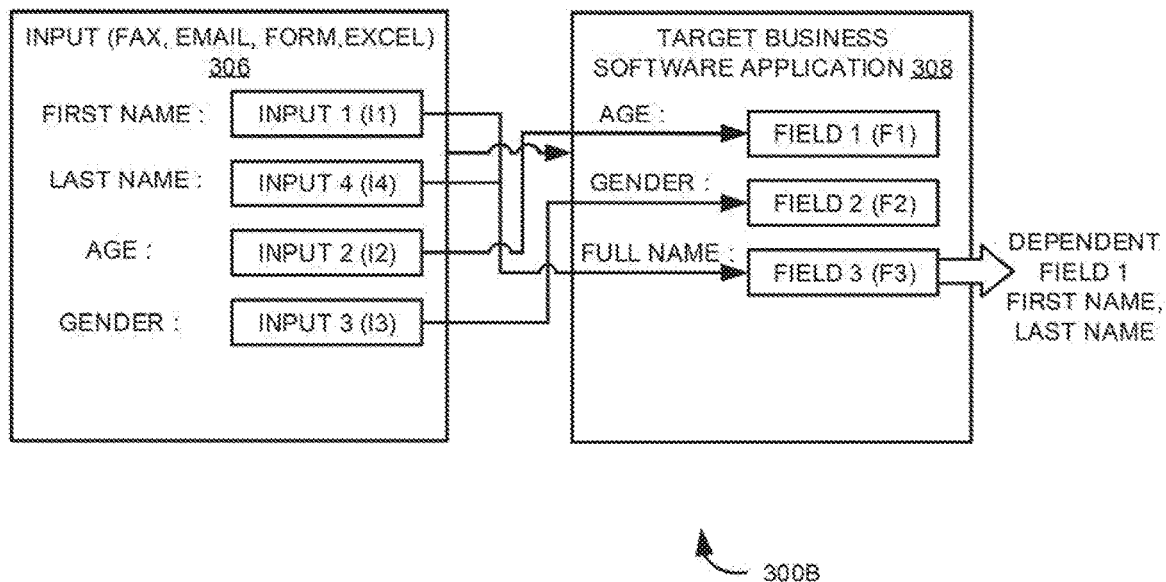
FIG. 3B depicts another example schematic diagram illustrating an activity performed in target business application via a robotic process using a robotic script generation system.

FIG. 3A depicts an example schematic diagram 300A illustrating an activity performed in target business application via a robotic process using robotic script generation system. In one example, input 302 may comprise of fields: name, age, and gender. The input may be received from a fax, email, form, excel sheet and the like. The target business software application 304 may have the same set of fields in a different order. The robotic script generation system 102 determines variations of the input fields and generates set of process steps to rightly fill the text fields of the target business software application as illustrated in FIG. 3A. FIG. 3B depicts another example schematic diagram 300B illustrating an activity performed in target business application via a robotic process using a robotic script generation system. In one example, input 306 comprises of four text fields: first name, last name, age, and gender. The target business software application 308 on the other hand comprises only three fields: age, gender, and full name. The text fields in 308 are different in both order and number. The robotic script generation system 102 determines variations of the input fields and generates set of process steps to rightly fill the text fields of the target business software application as illustrated in FIG. 3B.

In one example, the robotic script generation module generates robotic scripts to perform the activity based on input documents. Input documents may be received by the receiving module 110. The received input document may be classified using a second ANN by the classification module 118. The classification module 118 is communicatively connected to the neural network 120. The input document may be classified using a second ANN. Upon classifying the input document, the activity corresponding to the input document may be determined by the processing module 112. Once the activity is determined, the script generation module 116 executes the set of process steps corresponding to the activity to automatically fill a form related to the input document.

Figure 4:
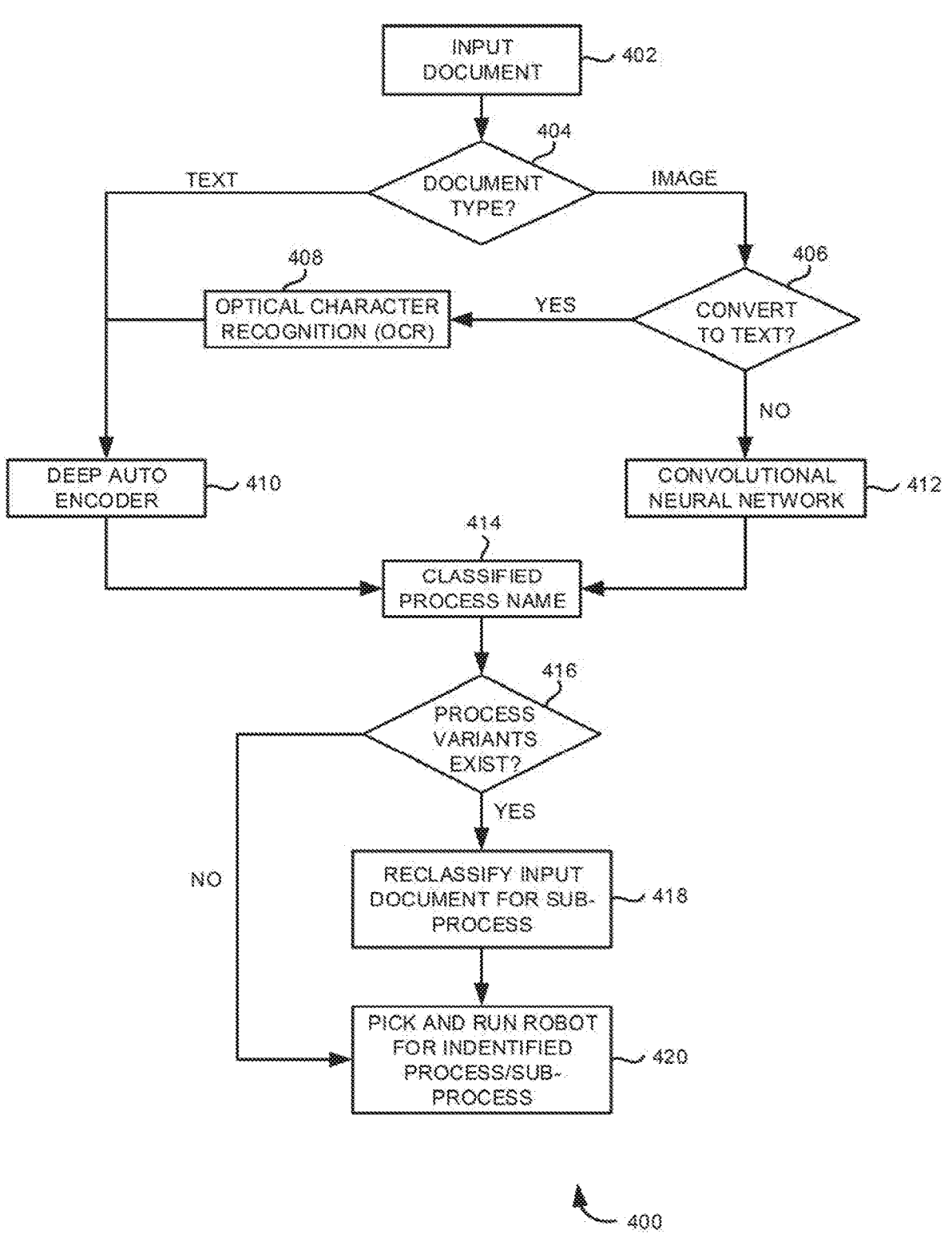
FIG. 4 is a flow diagram for generating robotic scripts to automatically fill input documents.

FIG. 4 is a flow diagram 400 for generating robotic scripts to automatically fill input documents. The robotic script generation system 102 may receive input in the form of documents for generating scripts. The input document may be a text document and/or an image document. At 402, input document may be received by the receiving module 110. Once input document is received, the system may determine a type of input document, at 404. If the input document is a text document, the input document may be processed by a Deep Auto Encoder for classification, at 410. If the input document is an image document, it is determined at block 406 whether to convert the input document to a text document. If the input document is in image format but is text-based document, then Optical Character Recognition (OCR) technique is employed to convert the image to a text document, at 408 and the process goes to 410, where the converted document is processed using the Deep Auto Encoder for classification. On the other hand, if the input document is an image, the input document is processed using a CNN for classification, at 412. The results of Deep Auto Encoder (i.e., 410) and CNN (i.e., 412) are received at block 414 as classified process name. At 416, the system may determine whether other variations of the classified process name exist. If other variants exist, the optimizing module 114 determines the optimal set of process steps at block 418 and executes the optimal set of process steps corresponding to the activity at block 420. If no other variations exist, the script generation module executes the determined set of process steps corresponding to the activity at block 420.

Input documents are classified by the robotic script generation system 102 using the second ANN. The second ANN may be a CNN or a Deep Auto Encoder. CNNs may generally be used to classify or identify an object in an image. It is a feed-forward neural network. In one example, the CNN may be trained by providing example images of different UI controls like option button, menu, button, tree, list etc. Subsequently during runtime whenever user performs an action on a control (for example clicking on radio button) in the GUI based application, the CNN may be able to identify that interface has a radio button at a certain location and that the location happens to be where the user interacted. In another example, the CNN is used is for process discovery or process variation detection. The CNN is trained to identify the activity based on an image which could be an input document. Upon receiving a copy of a filled input document (e.g. a loan application form), the CNN may be able to relate it to an activity in the application. Here, the activity would be filling a form related to loan application in the GUI based software.

Deep Auto Encoders are feed-forward neural networks. Deep Auto Encoders take a text document and then creates word counts of all words in the document. These word counts are then converted into a number set which is then represented in a vector space. These representations are performed for each document. During runtime, when a document is to be classified, the word counts are created and represented in the same vector space. Documents belonging to same topic (class) may be close to each other in vector space. This aspect is used to identify the activity that the document represents.

Figure 5:
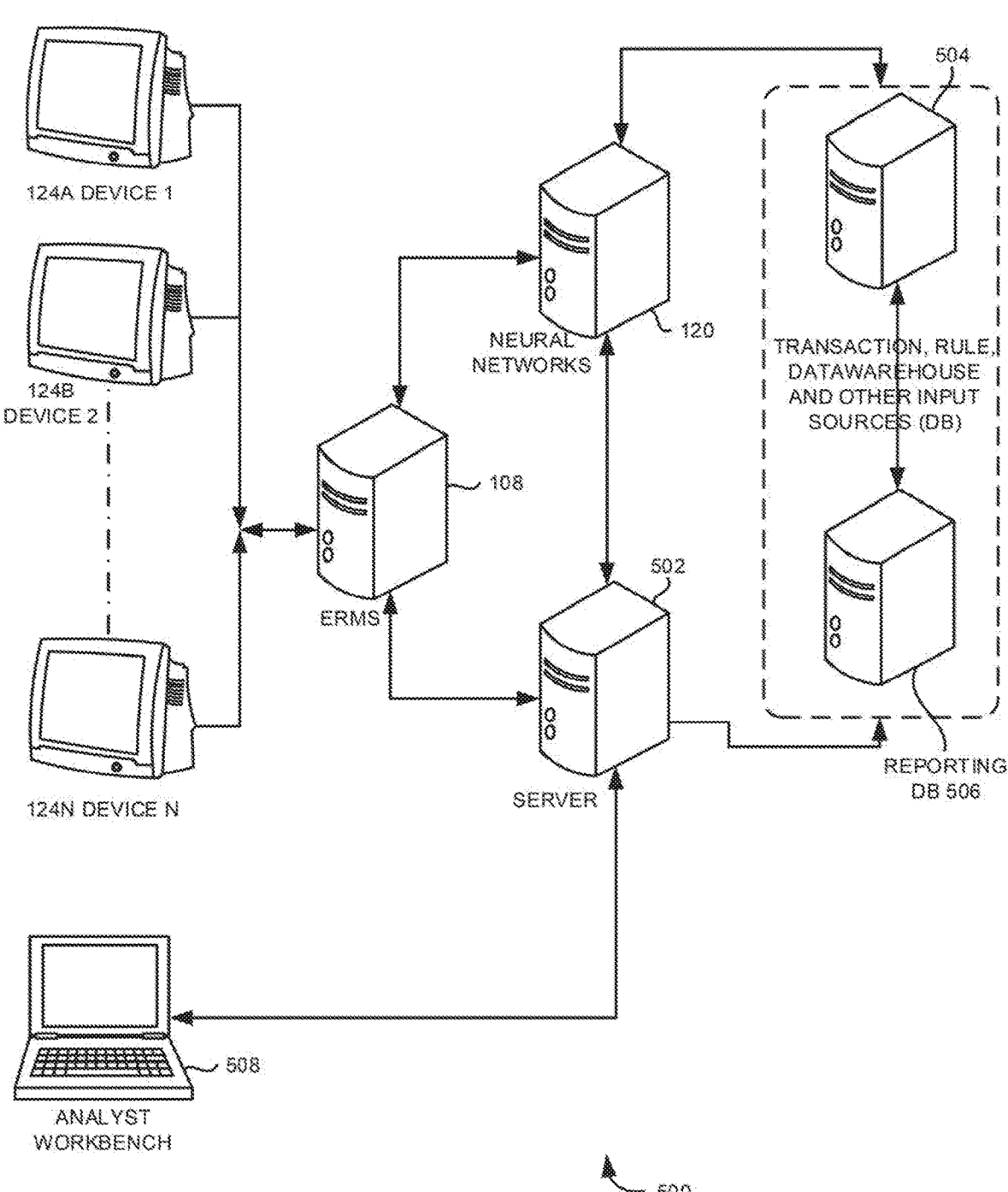
FIG. 5 is a block diagram illustrating an example robotic script generation platform including the robotic script generation system of FIG. 1.

FIG. 5 is a block diagram 500 illustrating an example robotic script generation platform including the robotic script generation system of FIG. 1. Server 502 comprises of processor(s) 104 and memory 106. Neural Networks 120 may reside inside the memory of the server as illustrated in FIG. 1 or reside separately as illustrated in FIG. 5. The server 502 is communicatively connected to an analyst workbench 508. A user such as an admin may be able to control the operations of the system, view and make modifications to the robotic scripts, switch between live and simulated environments for training the neural network, and so on at Analyst Workbench 508. The server 502 is connected to an Enterprise Repository Management System (ERMS) 108 which may act as a gateway between the plurality of devices 124A-N and the Robotic Script Generation System 102. The ERMS 108 may act as the control centre to manage all captured data from the plurality of devices, generated robotic scripts, training data sets, etc. The ERMS may be coupled to the neural network 120, the rules database 504 (e.g., transaction, rule, data warehouse and other input sources (DB)), and a reporting database 506. The ERMS may store the data to be managed in the databases 504. Reporting DB 506 may be used for retrieving the stored data.

FIG. 6 is an example flow diagram 600 of a method of generating a robotic script by process variation detection using ANNs. The process depicted in FIG. 6 represents generalized illustrations, and that other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design/fabricate circuits, generate programs, or use a combination of hardware and program to perform the illustrated processes.

At 602, captured process steps related to an activity performed in an application may be received. In one example, the captured process steps may be received from plurality of devices. The process steps may correspond to a sequence of GUI carried out for performing the activity. At 604, variations of the process steps in performing the activity may be determined by training a first ANN using the captured process steps. The first ANN may be an LSTM neural network. At 606, a set of process steps for performing the activity may be determined based on the variations of process steps. The set of process steps may correspond to a set of the determined variations of process steps. At 608, a robotic script may be generated for performing the activity using the determined set of process steps.

Figure 7:
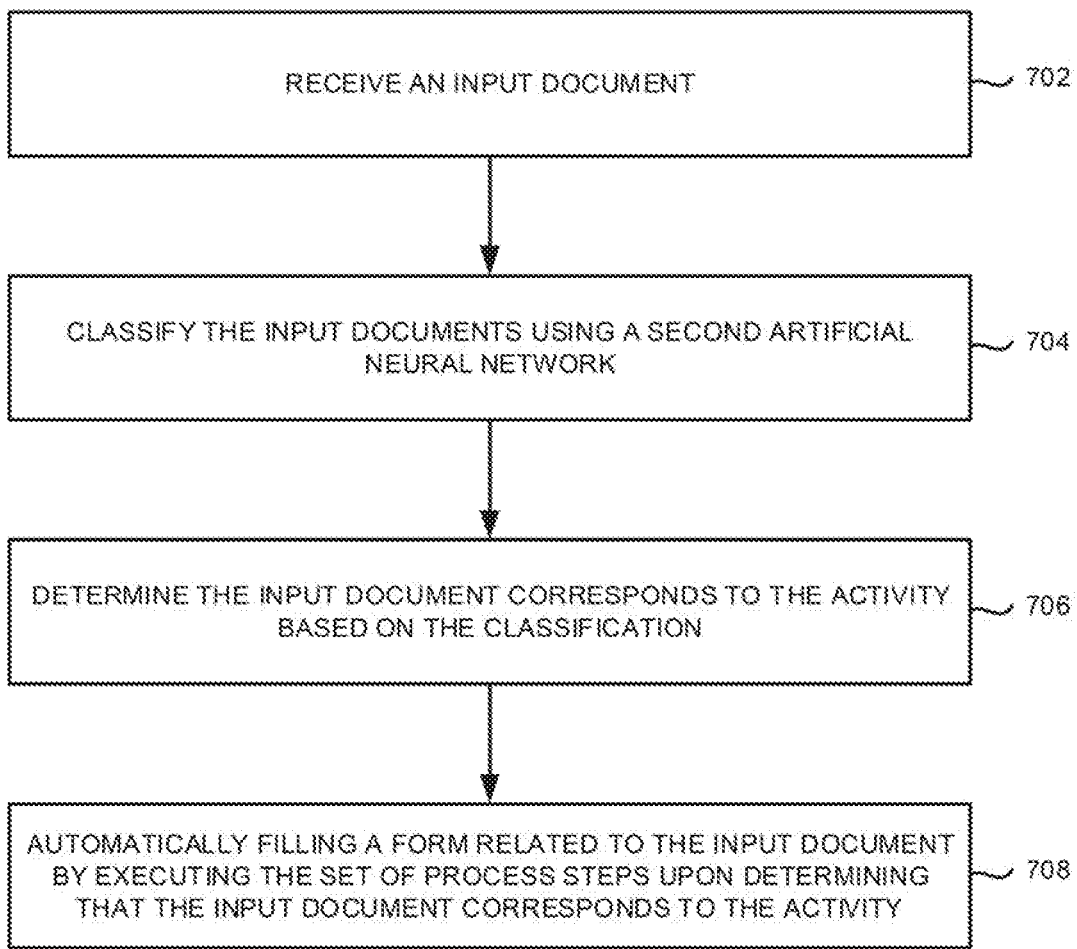
FIG. 7 is an example flow diagram of the method of generating a robotic script for automatically filling input documents.

FIG. 7 is an example flow diagram 700 of the method of generating a robotic script for automatically filling input documents. At 702, input document may be received, the input document may be an image document or a text document. At 704, the received input document may be classified using a second ANN. The second ANN may be a CNN or a Deep Auto Encoder. If the input document is an image document, it may be classified using the Deep Auto Encoder. If the input document is an image document, it may be classified using the CNN. At 706, based on the classification it is determined that the input document corresponds to an activity. At 708, the input document may be automatically filled by executing the set of process steps upon determining that the input document corresponds to the activity.

Figure 8:
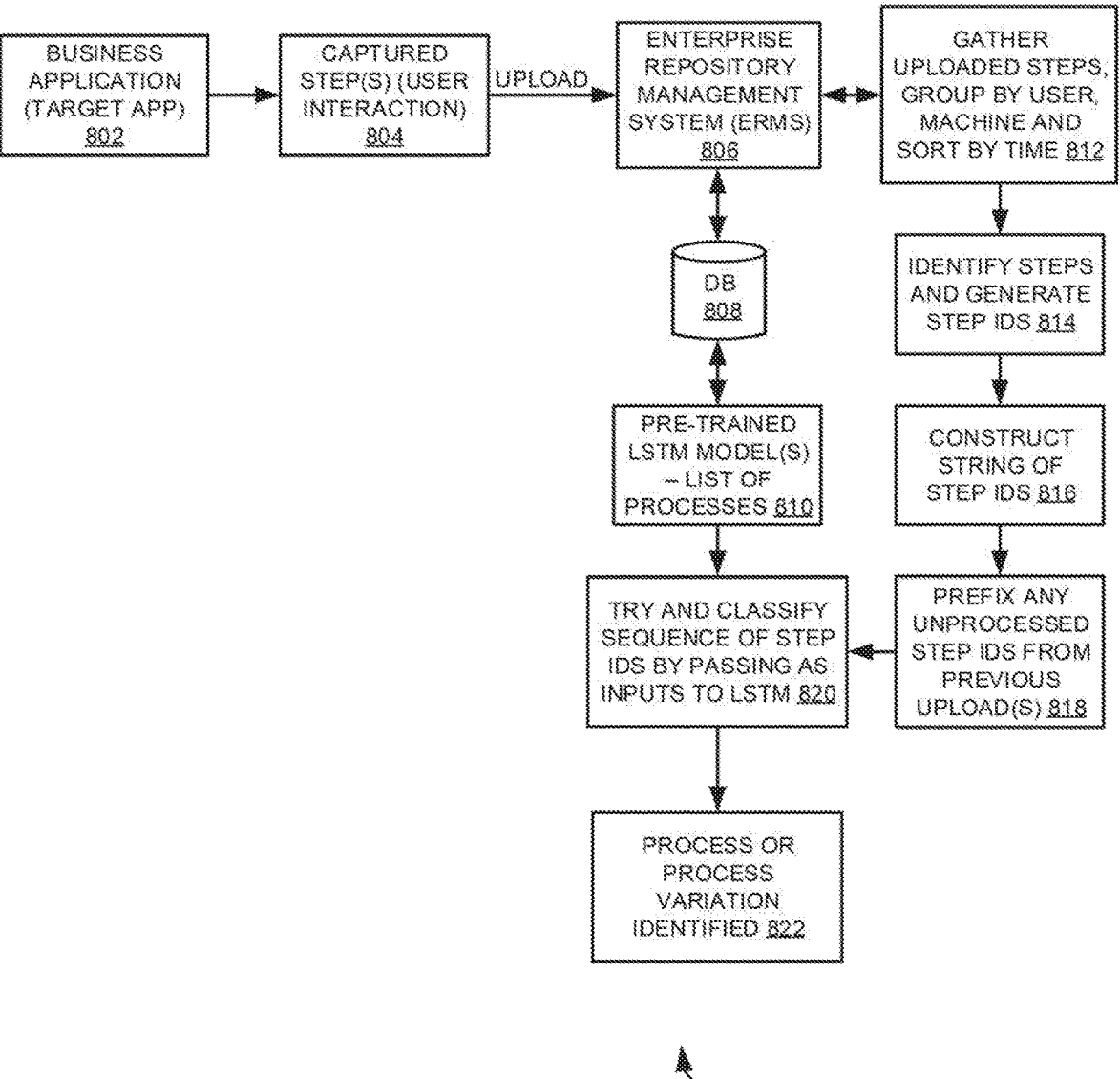
FIG. 8 is an example flow diagram of a process for predicting a next step to be performed in an activity.

FIG. 8 is an example flow diagram 800 of a process for predicting a next step to be performed in an activity. The technique is implemented with the help of LSTM neural network model. A user operating a software application may get stuck with completing a certain activity. The user may find it difficult to identify action to be performed after completing a series of process steps. For example, the user may be unable to find the "save" button after creating a document. It would be helpful if a software bot could monitor the actions of the user and identify what activity the user is performing in real time. Further, it will be advantageous if the bot could help the user complete the activity if the user gets stuck at any point while performing the activity.

The method illustrated in FIG. 8 solves the above identified problem. At 802, data in the form of user interactions are sent from a business application (target app). The application could be any software application. At 804, the user interactions with the target app 802 is captured. The captured steps are uploaded to an ERMS 806. The ERMS may store all the captured data in a database 808. At 810, a pre-trained LSTM model with a list of processes are maintained. The LSTM model may use the captured steps now available at 808 for further training the model. At 812, the system periodically gathers uploaded steps from the ERMS in real time. The gathered steps are grouped by user and machine. The steps are further sorted according to the time at which they were executed. At 814, the gathered steps are identified, and step ids are generated for each identified step. At 816, a string of step ids is constructed. At 818, if there are any unprocessed step ids from the previous upload, they are prefixed to the string of step ids. Based on the inputs received from 818, the process at 820 classifies the sequence of step ids by passing them as inputs to the LSTM model. At 822, the process or process variation is identified based on the output received from the pretrained LSTM model.

For illustration, let us consider that the target business application for FIG. 8 is a spread sheet application called "Letter Pad". Every user interaction with the GUI is captured as captured steps at 804. For example, a user, while creating a text-based document accidentally deletes a whole paragraph. The user may want to undo his action but may not know how to perform this function. Here, using the techniques provided in 800, the system may assist the user in finding the "undo button" in Letter Pad. Steps 812 to 818 are iterative and real-time in nature and are very crucial in performing next step prediction. Since the process steps are uploaded batch wise, the first batch might not have all necessary information for predicting the next step. The LSTM model comes into picture here, the previous batch is stored in the LSTM network's short-term memory. In one example, four batches of step ids may be required for identifying an activity. The LSTM keeps the step ids in its memory until all the batches are received and the activity is identified. Once the activity is identified and the next step prediction is completed, the LSTM may forget the step ids stored in its memory.

Figure 9A:
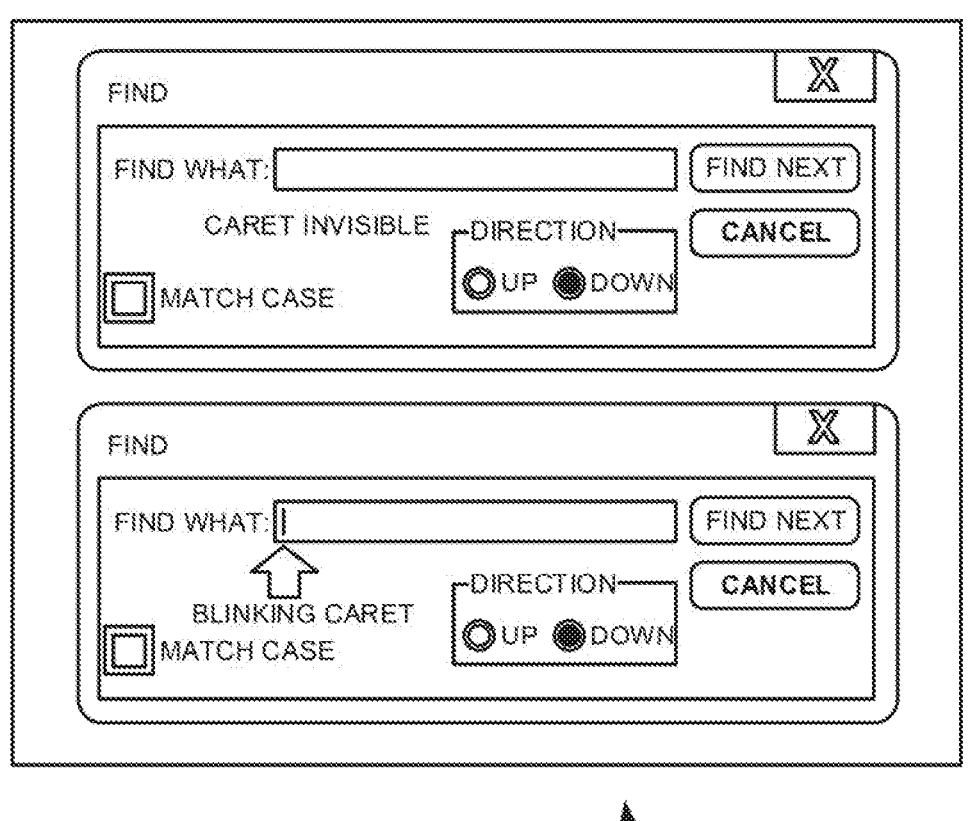
FIG. 9A depicts example screenshots of a GUI to determine user interactions.

FIG. 9A depicts example screenshots 900A of a GUI to determine user interactions. FIG. 9A depicts a technique for identifying the text field that a user may work on based on blinking keyboard caret. The two screenshots shown in FIG. 9A represent the same text box captured at a defined time interval. In the first screenshot, the caret is not visible. In the second screenshot the caret is visible. The system may compare these two screenshots taken between a brief time interval to identify the blinking caret as shown in FIG. 9A.

The method for finding the blinking caret accurately comprises: (i) Running a background thread/timer that captures screenshots of application interface every 0.5 seconds (configurable interval), (ii) Comparing the currently captured image with the image that was captured during the previous timer interval, (iii) Finding the differences between the two images, (iv) Discarding very small differences, e.g., any difference which is smaller than 2×2 pixel rectangle, (v) Identifying blinking caret/cursor, (vi) Given the region where the caret is blinking, finding the control which falls within this region, and (vi) Identifying that the control region is where the next user action/interaction may occur.

Figure 9B:
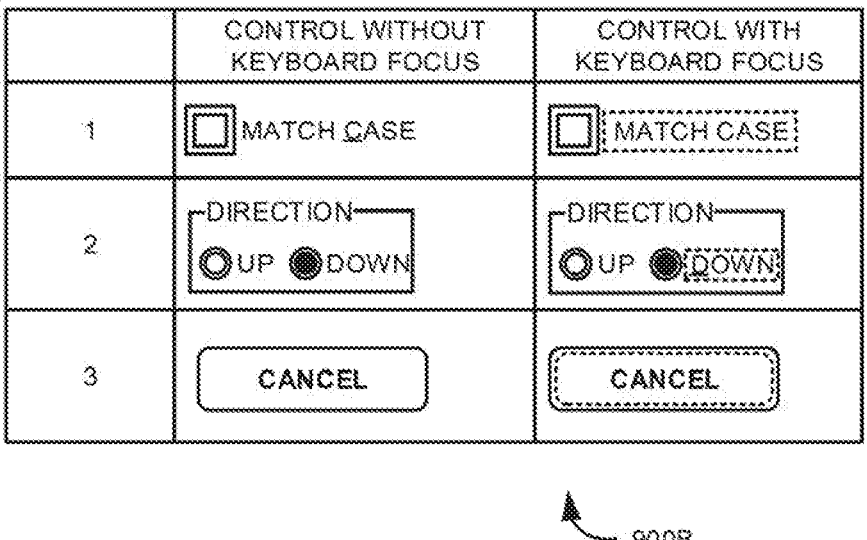
FIG. 9B is an example portion of the GUI of FIG. 9A depicting focus areas to determine the user interactions.

FIG. 9B is an example portion 900B of the GUI of FIG. 9A depicting focus areas to determine the user interactions. FIG. 9B depicts a technique for identifying the field that a user may work on based on visual highlights on the GUI elements. The focus area is detected using the visual highlight on the GUI elements. FIG. 9B illustrates the same controls captured at different time intervals with and without highlight on the focus area. The method for finding the focus area accurately comprises: (i) Running a background thread/ timer that captures images say every 0.5 seconds (configurable interval), (ii) Comparing the currently captured image with the image that was captured during the previous timer interval, (iii) Finding the differences between the two images, (iv) Discarding very small differences e.g., any difference which is smaller than 2×2 pixel rectangle, (v) Identifying the difference, the difference here would contain the focus rectangle, and (vi) Determining the control area, the control falling in this region is the new control with focus. This process is performed iteratively to detect any change in control focus. Further, the rectangles may be optionally zoomed out and zoomed in to create a blurred complete rectangle with all the dotted lines merged. Contours of this manipulated differential image may be detected to accurately identify focus area.

In one example, the process variation detection may be achieved by recognizing the elements of the user interface of the software application. User interface may be processed using neural networks like CNNs which may identify elements of images once trained. The system relies on visual appearance of user interface widgets as seen in a screenshot to understand the type of the widgets. While this works well, the algorithms are not generic for the different types of controls. For every type of control, its unique visual characteristics may be first identified manually and then corresponding algorithm developed for identifying those visual characteristics may be employed.

Different applications, development technologies, operating system versions, browsers and browser versions, and user interface widget libraries bring in their own nuances to the visual appearance of the control types. Added to that are the various skins and themes that make controls appear vastly different. All these pose challenges to the algorithms making it susceptible to accuracy issues and need for constant maintenance/improvement. It would help to have a generic algorithm which may learn from examples of user interface control images. This would enable training the algorithm with any new variations of the control that may be encountered without having to change the algorithm itself.

Controls have distinct visual characteristics and are easily identifiable by humans. Custom feature extraction and detection algorithms are useful but are time consuming to develop. They are susceptible to theme changes requiring the algorithms to be modified/adapted. Image Classification is the task of assigning an input image a label from a fixed set of categories. Many Computer Vision tasks such as object detection, segmentation may be reduced to image classification. For example, an image classification model takes a single image and assigns probabilities to 4 labels, {cat, dog, hat, mug}. A computer image is represented as one large 3-dimensional array of numbers and has three colour channels Red, Green, Blue (or RGB). Each number is an integer that ranges from 0 (black) to 255 (white). The task is to turn this matrix into a single label, such as "cat". Neural networks are good at learning based on examples. Using such techniques, control regions of GUIs may be classified easily.

CNN is a type of feed-forward ANN inspired by the visual cortex in animals. CNNs are variations of multilayer perceptions designed to use minimal amounts of pre-processing. CNNs may be used for image recognition and classification. When used for image recognition, CNNs consist of multiple layers of small neuron collections which process portions of the input image, called receptive fields. The outputs of these collections are then tiled so that their input regions overlap, to obtain a better representation of the original image. This is repeated for every such layer. Tiling allows CNNs to tolerate translation of the input image.

The system provides the ANN with many examples of each class and then develop learning algorithms that look at these examples and learn about the visual appearance of each class. This approach is referred to as a data-driven approach, since it relies on first accumulating a training dataset of labelled images. With good example images that represent the class of images to be identified with various themes, operating system specific control appearances, different browsers, different versions of the browsers, applications, control/widget libraries, screen resolution, control sizes, control variants, control states (checked/unchecked, selected item, empty control, filled control etc), a good image classification model must be invariant to the cross product of all these variations. At the same time, sensitivity to inter-class variations should be retained. The task of constructing the neural network involves deciding the number of hidden layers, the number of nodes in each layer, the cost function, the learning rate, etc.

The task in image classification is to take an array of pixels that represents a single image and assign a label to it. The overall process of training the CNN model may comprise: (i) Input: The input consists of a set of N images, each labelled with one of K different classes. This is referred to as the training set, (ii) Learning: The task is to use the training set to learn what every one of the classes looks like, (iii) Evaluation: Finally, quality of the classifier is evaluated by asking it to predict labels for a new set of images that it has never seen before. The process is repeated iteratively to increase the accuracy and reliability of classification process.

Figure 10:
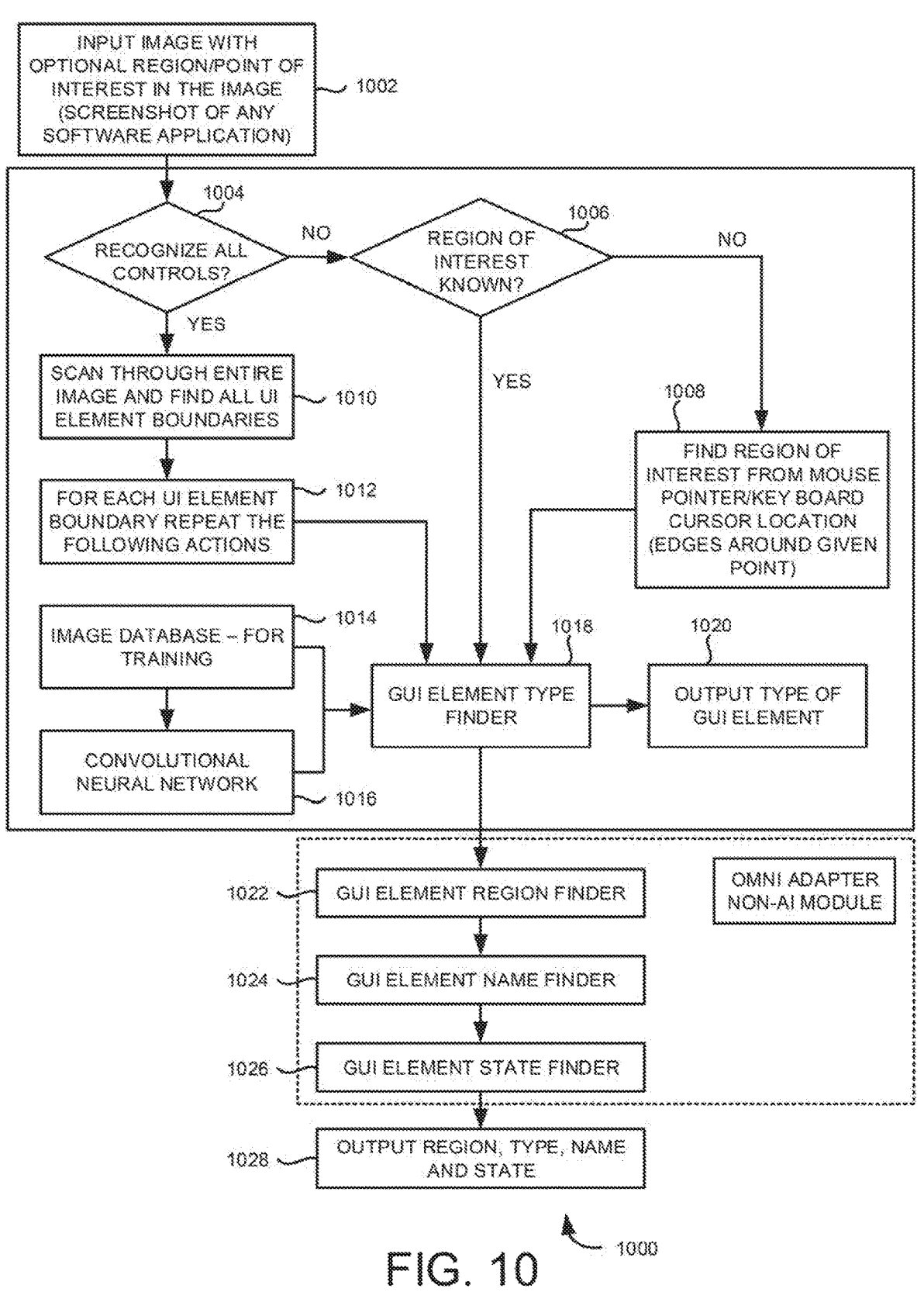
FIG. 10 is an example flow diagram for visual user interface identification using Artificial Neural Networks.

FIG. 10 is an example process 1000 for performing user interface recognition using CNNs. At 1002, an input image is received, the input image may optionally have a region/point of interest in the image. The input image may be a screenshot of any software application. At 1004, the process determines whether all controls are recognized. If the controls are not recognized, it is determined at 1006 whether the region of interest is known. If the region of interest is not known at 1006, the process finds the region of interest at 1008 from mouse pointer/keyboard cursor location based on the edges around given point using the trained CNN. Once, the region of interest is determined at 1008, the process continues to determine GUI element type finder 1018. If the region of interest is known at 1006, the process continues to determine GUI element type finder 1018. If all the controls were recognized at 1004, the process moves to 1010 wherein the entire image is scanned to find all UI element boundaries. At 1012 each element boundary is sent for further processing to GUI element type finder 1018. Further the image database for training 1014 is sent to the CNN 1016 and the results are shared with the GUI element type finder 1018. At 1020, output type of the GUI element is determined using the received processed information and the CNN. Further, using the identified information i.e. output type of GUI element, the process determines GUI element region at 1022. At 1024 the GUI element name is determined and at 1026 the GUI element state is determined. The final output is received at step 1028 wherein the input region, type, name, and state of each GUI element is determined. Process steps 1022-1028 are platform independent and need not depend on the CNN.

Figure 11:
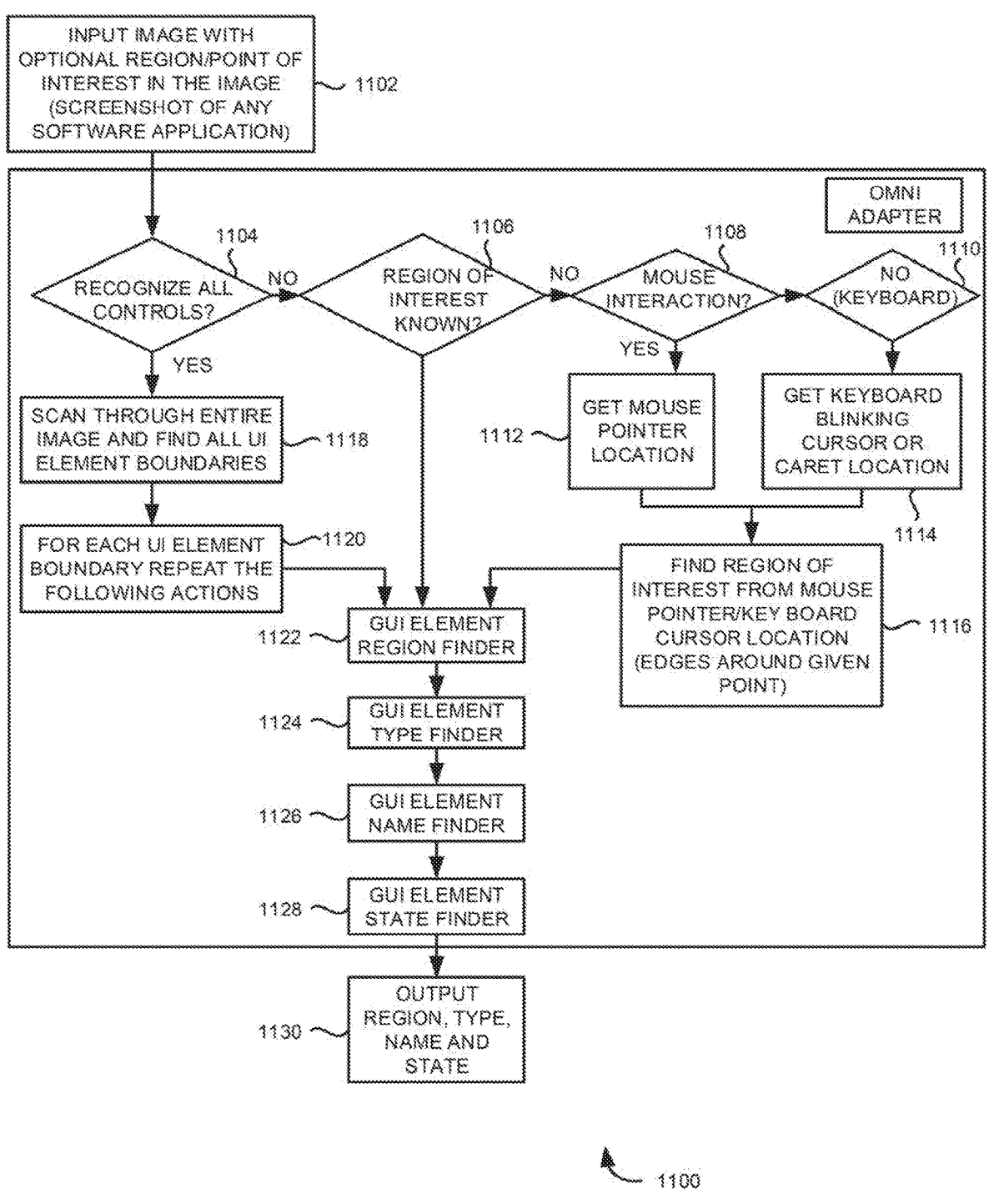
FIG. 11 is an example flow diagram for visual user interface identification using pattern recognition techniques.

FIG. 11 is an example process 1100 for performing user interface recognition using pattern recognition. Instead of using a neural network, a pattern recognition technique is used herein for performing user interface recognition. In this technique, there are 3 important fields that are required for recognition. Control location, control type, and control name. Using this information, capture may automatically generate instructions for documents, simulations, live-in-the-app guide, context aware business rule validation, automated helpdesk, robot script generation etc.

Recognizing Control Location

Control location may be captured by the following process. Starting from the mouse point (mx, my) find the boundaries on all four sides. A boundary is defined as a visible line which distinguishes this control from the rest of the screen space. Find the color of the pixel at (mx, my). Compare the pixels going upwards from this point to see if the color changes. When the color change occurs, mark this as the top boundary. For the comparison, exclude gradient color differences. The color difference should be significant to mark it as a boundary. The second challenge is to skip the text in the control. Since the text color is usually very contrasting to the control, it will be falsely identified as a boundary. To avoid this, compare consecutive pixel colors if the color is different, then try to get the width of that color in both rows. If the width of both rows is more than a typical character width in pixels, then it can be treated as a true boundary. Otherwise, these pixels are part of some text and hence skip this row and go to next row. Using the similar logic, repeat the process to find the boundary below the pixel (mx, my). Now, top and bottom boundaries have been identified. Starting from the top boundary pixel, using similar logic, find the left most boundary and right most boundary.

The above logic works fine for typical buttons, text boxes, toolbar buttons, menu items, combo box selection items, grid cells, and the like, where there is a clear boundary line. There are some controls where there is no visible boundary. For example, radio button text, list box items, etc. In this case, the above logic will identify a region encompassing the complete list box, or the group box. So, this region needs to be revised further to get the required control region.

In one example logic, the control region is identified by the following technique. If the height of region found in phase-1 is more than a typical control height, then apply the following logic. Starting from the same pixel (mx, my) going upwards, find the width of the line with the same color in each row. If the line width is more than the minimal width of a list box, then this may be treated as the boundary in that direction. This will occur as there is a minimum of 2 pixels empty space between list box items. Repeat the process for the lower boundary. Using the revised top boundary value, find the left and right boundaries again. This region will now identify the selected list item, radio button etc.

Recognizing Control Type

Once the control region is identified, control type may be identified using the following logic. To classify the control types, inspect the control's width, height, text position inside the control, point of click with reference to the control, maximum color inside the control ratio of the control's width to its height and the actions performed on a control in sequence.

A few examples are: If the ratio of width to height is 1 the height is <14, then the control is a checkbox. If the ratio of width to height is 1 the height is <15, then the control is a drop-down button. If the text inside the control is center aligned, then the control is a button. If the height is <21 and width >50 and the point of click is at the right end of the control then, the control is a combo box. If the text inside the control is left aligned or empty, then the control is a Textbox. If the controls height to width ratio is >4 then the control is a vertical scroll bar. If the maximum color inside the control is white, then the control may be a list item or radio button, which may further be classified after finding the control name using OCR.

Recognizing Control Name

Using an Optical Character Recognition (OCR) engine and the control region identified above, read the text from the image. This text may be used in identifying the name of the control. For controls identified as Button, menu item, tab button, list item, combo box item, radio button, the OCRed text is used as the name of the control. For controls identified as Textbox, OCR the text to the left of the Text box region using OCR zones. The position of the label text may be configured so that the labels positioned above the text box may also be captured. This logic may also be applied to the combo box controls which as no selected item.

Referring to FIG. 11, at 1102, an input image is received, the input image may optionally have a region/point of interest in the image. The input image may be a screenshot of any software application. At 1104, the process determines whether all controls are recognized. If the controls are not recognized, it is determined at 1106 whether the region of interest in known. If the region of interest is not known at 1106, the process checks if there is any mouse interaction at 1108 or if there is any keyboard interaction at 1110. If mouse interaction is found, the mouse pointer location is determined at 1112. If keyboard interaction is found, the keyboard blinking cursor or caret location is obtained at 1114. The process then finds the region of interest at 1116 from mouse pointer/keyboard cursor location based on the edges around given point. Once, the region of interest is determined at 1116, the process continues to determine GUI element type finder at 1122. If the region of interest is known at 1106, the process continues to determine GUI element type finder. If all the controls were recognized at 1104, the process moves to 1118 wherein the entire image is scanned to find all UI element boundaries. At 1120 each element boundary is sent for further processing to GUI element type finder 1122. At 1124 the GUI element type is determined, at 1126 the GUI element name is determined, and at 1128 the GUI element state is determined. The final output is received at 1130 wherein the GUI element's region, type, name, and state are provided as output.

In one example, changes in updated versions of software applications are identified by a change management system. The changes may include updates to GUI elements, updates to workflow process, and cosmetic updates in the GUI like colour, theme, shapes, and the like. Scripts may even be used to document the identified changes to the UI. FIG. 12 is an example method for detecting such changes. Once, the changes between different versions of software applications are identified, robotic scripts that may be affected due to the changes are identified. The change management system may identify such robotic scripts and may update them accordingly. The robotic scripts may be updated to make them compatible with the new version of the software application.

FIG. 12 is an example flow diagram 1200 illustrating an automated change management process for creating knowledge transfer documentation for business transformations (software updates) based applications. At 1202, GUI inventory for different versions of an application is collected. The application GUI inventory generated by the plurality of applications may have unique way and structure of defining GUI. The canonical GUI inventory structure would contain information about the application name, the version of the application, the various binaries, the list of GUI screes/windows/pages etc, unique identifier of screens, other properties of screens like title/caption etc. At 1204, two versions of an application are compared to find the differences between them. On comparing the screen properties and constituent controls, the list of screens that have changed between the two versions and the list of controls that have their properties changed may be identified. At 1206, a dependency tree is created from the GUI inventory for a different version of an application. It creates a link between the screens and controls in the GUI inventory with the process capture and other knowledge transition interventions. At 1208, the affected process is identified from the dependency tree. It will help to extract the list of affected process in the different version of an application. At 1210, the extent of changes between the two version of an application is found. This will help to decide on whether the change may be handled manually or not and is the change large enough to be documented or can it be skipped altogether, etc. At 1212, a data file from the recorded process is generated using robotic process automation (RPA). Recorded process comprises of the extent of changes found in the previous step from the dependency tree. It may be used as an example for creating other instances of data. The data file would have references to the step and the data as columns. At 1214, the workflow is re-recorded to automate change management for the application. The re-recording capability may playback previously recorded processes on the target application. The automation engine would navigate through all the process objects in a workflow and re-record each of them. The workflow is then updated with references to the newly recorded processes.

Figure 13:
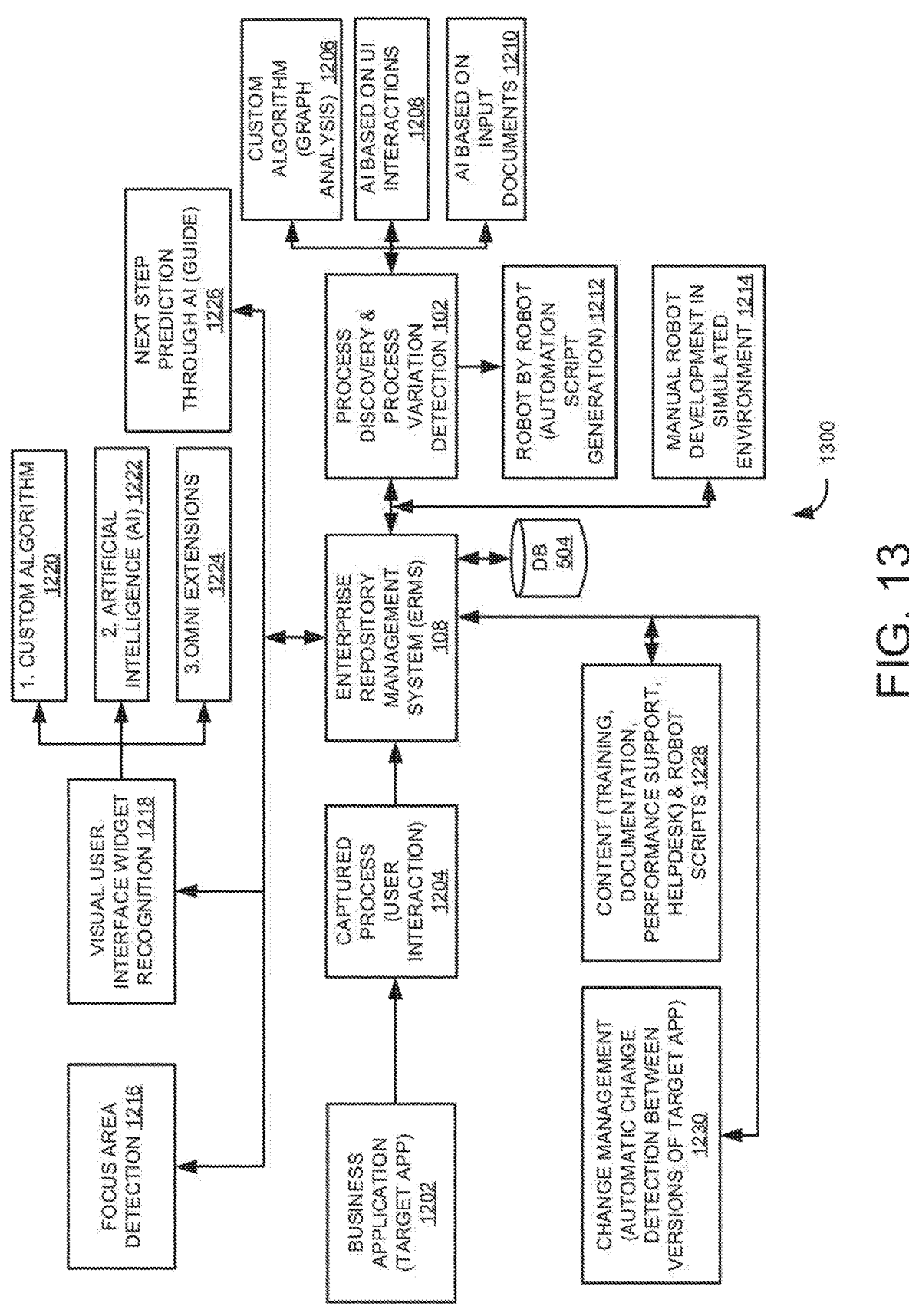
FIG. 13 is an example high-level architecture of the robotic script generation system using ANNs capable of performing various functions.

FIG. 13 is a high-level architecture 1300 of the robotic script generation system using ANNs capable of performing various functions. 1202 is a business application (target app). The business application may be any GUI based software application running on any remote device/desktop. Captured process steps (e.g. user interactions) are received at 1204 from the target apps. The enterprise resource management system 108 (referring to FIGS. 1 and 5) may act as the control centre to manage all captured data from plurality of devices, generated robotic scripts, training data sets, etc. The ERMS may store the data to be managed in the databases 504. Process discovery and process variation detection represents the robotic script generation system 102 of FIG. 1. Process discovery and variation detection may be performed using custom algorithms (graph analysis) at 1206, and/or AI based on user interactions at 1208, and/or AI based on input documents at 1210. At 1212, the robotic scripts may be generated automatically i.e. robot by robot (automatic script generation). At 1214, the robots may be developed manually in a simulated environment. At 1216, the system may be configured to detect focus area of user interaction as illustrated in FIGS. 9A and 9B. At 1218, the system may be configured to identify GUI elements using a visual user interface widget recognition technique. At 1220, UI is recognized using custom algorithms as illustrated in this document with reference to FIG. 11. At 1222, UI is recognized using Artificial Intelligence (AI) as illustrated in this document with reference to FIG. 10. At 1224, UI is recognized using OMNI extensions which are platform independent modules. At 1226, the system may be configured to predict next step a user may perform through AI based guide as illustrated in this document with reference to FIG. 8. At 1228, the system may be configured to generate content for training, documentation, performance support, and helpdesk using robotic scripts. At 1230, the system may be configured for managing changes in different versions of a software application as illustrated in this document with reference to FIG. 12. The architecture 1300 need not necessarily include all the blocks shown in FIG. 13 for its functioning. One or more blocks may be added, removed, or modified as per the needs of an organization. Blocks depicted in FIG. 13 are exemplary in nature.

FIG. 14 is a block diagram an example system 1400 including instructions in a machine-readable storage medium for generating robotic scripts. System 1400 includes processor(s) 104 analogous to the one referred in FIG. 1, and a non-transitory machine-readable storage medium 1402 communicatively coupled through a system bus. The term "computer-readable medium" should be understood to include tangible items and exclude carrier waves and transient signals, i.e., be non-transitory. Processor(s) 104 may be any type of Central Processing Unit (CPU), microprocessor, or processing logic that interprets and executes machine-readable instructions stored in machine-readable storage medium 1402. Machine-readable storage medium 1402 may be a RAM or another type of dynamic storage device that may store information and machine-readable instructions that may be executed by processor(s) 104. For example, machine-readable storage medium 1402 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium.

Referring to FIG. 14, non-transitory machine-readable storage medium 1402 may store instructions 1404, 1406, 1408, and 1410. In an example, instructions 1404 may be executed by processor(s) 104 to receive captured process steps related to an activity performed in an application. Instructions 1406 may be executed by processor(s) 104 to determine variations of the process steps in performing an activity by training a first ANN with the captured process steps. Instructions 1408 may be executed by processor(s) 104 to determine a set of process steps for performing the activity based on the determined variations of the process steps. Instructions 1410 may be executed by processor(s) 104 to generate robotic scripts to perform the activity using the determined set of process steps. In an example, the instructions to generate robotic scripts content may also comprise receiving an input document, classifying the input document to determine the activity corresponding to the input document, and to execute the set of process steps for filling the input document.

The illustrated steps are set out to explain the exemplary embodiments shown, and it should be anticipated that ongoing technological development will change the way functions are performed. These examples are presented herein for purposes of illustration, and not limitation. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The scope of the present disclosure includes any feature or combination of features disclosed herein (either explicitly or implicitly), or any generalization thereof, whether it mitigates any or all the problems addressed herein. Various advantages of the present disclosure have been described herein, but embodiments may provide some, all, or none of such advantages, or may provide other advantages.

In the foregoing detailed description, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, inventive subject matter lies in less than all features of a single disclosed embodiment. Thus, the following claims are hereby incorporated into the detailed description, with each claim standing on its own as a separate embodiment.

What is claimed is:

1. A system comprising:

a processor; and a memory communicatively coupled to the processor, wherein the memory is capable of executing a plurality of modules stored in the memory, and wherein the plurality of modules comprises:

a receiving module to receive captured process steps related to an activity performed in an enterprise resource planning (ERP) application, wherein the captured process steps comprise multiple sequences of graphical user interface (GUI) interactions carried out by users for performing the activity in the ERP application, and wherein the GUI interactions refer to human interface device actions performed on a GUI to execute the activity;

a processing module to determine multiple variations of process steps for performing the activity by applying a first Artificial Neural Network (ANN) to the captured process steps, wherein each variation includes a combination of the process steps such that the activity can be performed by executing any one of the multiple variations, and wherein the first ANN determines a category to which the process steps belong to thereby connecting the process steps to the activity;

an optimization module to determine an optimized set of the process steps for performing the activity based on the determined variations of the process steps, wherein the optimized set of process steps includes process steps selected from at least one of the multiple variations such that the activity is performed in an manner with a reduced amount of processing resources; and a script generation module to:

compare screenshots of the ERP application taken at different time intervals to identify a control field location, control field type, and control field name at which a next user action occurs; and upon identifying the control field location, control field type, and control field name at which the next user action occurs, generate a software robot to automate a process of performing the activity associated with the next user action using the determined optimized set of process steps, wherein the generated software robot, upon execution, mimics the GUI interactions by executing the optimized set of the process steps for performing the activity.

2. The system of claim 1, wherein the script generation module generates the software robot automatically.

3. The system of claim 1, wherein the script generation module generates the software robot manually in a simulated environment.

4. The system of claim 1, wherein the captured process steps are fed to the first ANN in the form of Extensible Markup Language (XML) files and/or hash codes.

5. The system of claim 1, wherein the first ANN is a Recurrent Neural Network (RNN), and wherein the RNN is a Long Short-Term Memory (LSTM) network.

6. The system of claim 1, comprising a classification module, wherein the receiving module is to receive an input document;

the classification module is to classify the input document using a second ANN;

the processing module is to determine the input document that corresponds to the activity based on the classification; and the robotic script generation module is to automatically fill a form related to the input document by executing the set of process steps upon determining that the input document corresponds to the activity.

7. The system of claim 6, wherein the input document is a text document and/or an image document.

8. The system of claim 7, wherein the second ANN is a Feed Forward Neural Network, and wherein the Feed Forward Neural Network is a Convolutional Neural Network (CNN) or a Deep Auto Encoder.

9. The system of claim 8, wherein the classification module is configured to:

classify the text document using the Deep Auto Encoder; and classify the image document using the CNN.

10. A computer-implemented method comprising:

receiving captured process steps related to an activity performed in an enterprise resource planning (ERP) application, wherein the captured process steps comprise multiple sequences of graphical user interface (GUI) interactions carried out by users for performing the activity in the ERP application, and wherein the GUI interactions refer to human interface device actions performed on a GUI to execute the activity;

determining multiple variations of process steps for performing the activity by applying a first Artificial Neural Network (ANN) to the captured process steps, wherein each variation includes a combination of the process steps such that the activity can be performed by executing any one of the multiple variations, and wherein the first ANN determines a category to which the process steps belong to thereby connecting the process steps to the activity;

determining an optimized set of the process steps for performing the activity based on the determined variations of the process steps, wherein the optimized set of process steps includes process steps selected from at least one of the multiple variations such that the activity is performed in an manner with a reduced amount of processing resources; and comparing screenshots of the ERP application taken at different time intervals to identify a control field location, control field type, and control field name at which a next user action occurs; and upon identifying the control field location, control field type, and control field name at which the next user action occurs, generating a software robot to automate a process of performing the activity associated with the next user action using the determined optimized set of process steps, wherein the generated software robot, upon execution, mimics the GUI interactions by executing the optimized set of the process steps for performing the activity.

11. The computer-implemented method of claim 10, wherein the software robot is generated automatically, or manually in a simulated environment.

12. The computer-implemented method of claim 10, wherein the captured process steps are fed to the first ANN in the form of Extensible Markup Language (XML) files and/or hash codes.

13. The computer-implemented method of claim 10, wherein the first ANN is a Recurrent Neural Network (RNN), and wherein the RNN is a Long Short-Term Memory (LSTM) network.

14. The computer-implemented method of claim 10, wherein generating the software robot to perform the activity comprises:

receiving an input document;

classifying the input document using a second ANN;

determining the input document corresponds to the activity based on the classification; and automatically filling a form related to the input document by executing the set of process steps upon determining that the input document corresponds to the activity.

15. The computer-implemented method of claim 14, wherein the second ANN is a Feed Forward Neural Network, and wherein the Feed Forward Neural Network is a Convolutional Neural Network (CNN) or a Deep Auto Encoder.

16. The computer-implemented method of claim 15, wherein classifying the input document comprises:

classifying the input document using the Deep Auto Encoder upon determining that the input document is a text document; and classifying the input document using the CNN upon determining that the input document is an image document.

17. A non-transitory machine-learning medium storing instructions executable by a processing resource to:

receive captured process steps related to an activity performed in an enterprise resource planning (ERP) application, wherein the captured process steps comprise multiple sequences of graphical user interface (GUI) interactions carried out by users for performing the activity in the ERP application, and wherein the GUI interactions refer to human interface device actions performed on a GUI to execute the activity;

determine multiple variations of process steps for performing the activity by applying a first Artificial Neural Network (ANN) to the captured process steps, wherein each variation includes a combination of the process steps such that the activity can be performed by executing any one of the multiple variations, and wherein the first ANN determines a category to which the process steps belong to thereby connecting the process steps to the activity;

determine an optimized set of the process steps for performing the activity based on the determined variations of the process steps, wherein the optimized set of process steps includes process steps selected from at least one of the multiple variations such that the activity is performed in an manner with a reduced amount of processing resources; and compare screenshots of the ERP application taken at different time intervals to identify a control field location, control field type, and control field name at which a next user action occurs; and upon identifying the control field location, control field type, and control field name at which the next user action occurs, generate a software robot to automate a process of performing the activity associated with the next user action using the determined optimized set of process steps, wherein the generated software robot, upon execution, mimics the GUI interactions by executing the optimized set of the process steps for performing the activity.

18. The non-transitory machine-readable medium of claim 17, wherein the software robot is generated automatically, or manually in a simulated environment.

19. The non-transitory machine-readable medium of claim 17, wherein the first ANN is a Long Short-Term Memory (LSTM) Network.

20. The non-transitory machine-readable medium of claim 17, wherein generating the software robot to perform the activity comprises instructions to;

receive an input document;

classify the input document using a second ANN;

determining the input document corresponds to the activity based on the classification; and automatically fill a form related to the input document by executing the set of process steps upon determining that the input document corresponds to the activity.

21. The non-transitory machine-readable medium of claim 20, wherein the second ANN is a Convolutional Neural Network (CNN) or a Deep Auto Encoder.

* * * * *